United States Patent
Kessler et al.

(10) Patent No.: US 8,791,807 B2
(45) Date of Patent: Jul. 29, 2014

(54) METHOD FOR ALLOCATING IDENTIFIERS OF WHEEL ELECTRONICS OF A TIRE PRESSURE MONITORING SYSTEM OF A VEHICLE TO THE POSITIONS OF ABS SENSORS ON THE VEHICLE

(75) Inventors: Ralf Kessler, Pfinztal (DE); Andreas Kraft, Gondelsheim (DE); Markus Wagner, Ludwigsburg (DE); Jürgen Schönbeck, Bretten (DE); Peter Brand, Kieselbronn (DE)

(73) Assignee: Huf Huelsbeck & Fuerst GmbH & Co, KG (DE)

( * ) Notice: Subject to any disclaimer, the term of this patent is extended or adjusted under 35 U.S.C. 154(b) by 370 days.

(21) Appl. No.: 13/197,988

(22) Filed: Aug. 4, 2011

(65) Prior Publication Data

US 2012/0060598 A1    Mar. 15, 2012

(30) Foreign Application Priority Data

Aug. 31, 2010 (DE) .......................... 10 2010 036 008
Sep. 13, 2010 (DE) .......................... 10 2010 037 512

(51) Int. Cl.
    *B60C 23/00*    (2006.01)
(52) U.S. Cl.
    USPC .......................................... 340/442; 73/146.5
(58) Field of Classification Search
    USPC ................................. 73/146.5; 340/442–448
    See application file for complete search history.

(56) References Cited

U.S. PATENT DOCUMENTS

| | | | | |
|---|---|---|---|---|
| 5,808,190 A | * | 9/1998 | Ernst ............................. | 73/146.5 |
| 6,633,229 B1 | * | 10/2003 | Normann et al. ............. | 340/447 |
| 7,148,793 B2 | * | 12/2006 | Lin ................................ | 340/442 |
| 7,283,924 B2 | * | 10/2007 | Lauer et al. ................... | 702/147 |
| 7,503,210 B2 | * | 3/2009 | Lauer et al. .................. | 73/146.5 |

FOREIGN PATENT DOCUMENTS

WO    WO 03/086788 A1    10/2003

* cited by examiner

*Primary Examiner* — John Fitzgerald
*Assistant Examiner* — Xin Zhong
(74) *Attorney, Agent, or Firm* — Keith H. Orum; Orum & Roth, LLC

(57) ABSTRACT

Allocates identifiers of units of a tire pressure monitoring system to the positions of ABS-sensors which are each assigned to the wheels of the vehicle. The identifiers are contained in signals that are emitted by the units. Each unit, which is called a wheel electronic, has a pressure sensor, which is sensitive to the tire pressure of the wheel, a motion sensor, which provides information on the rotation speed of the wheel, a memory with the individual identifier of the wheel stored therein, and a transmitter, which transmits signals only containing information on the rotation speed of the respective wheel, to a receiver. An evaluation device receives the transmitted identifier and compares the information on the rotation speed of the wheel transmitted along with the identifier, with rotation speed information, which were acquired by the ABS sensors for the same time span and transferred to the evaluation device.

12 Claims, No Drawings

METHOD FOR ALLOCATING IDENTIFIERS OF WHEEL ELECTRONICS OF A TIRE PRESSURE MONITORING SYSTEM OF A VEHICLE TO THE POSITIONS OF ABS SENSORS ON THE VEHICLE

The invention concerns a method for allocating identifiers, which are contained in signals emitted by units of a tire pressure monitoring system of a vehicle to the positions of ABS-sensors, which are assigned to the wheels of the vehicle. In the following text, these units which are mounted on the wheels of the vehicle are called wheel electronics. Each wheel electronic comprises a pressure sensor, which is sensitive to the tire pressure of the wheel, a motion sensor, in particular an acceleration sensor, which provides information on the rotation speed of the wheel, a memory, in which an individual identifier of the wheel electronic is stored, and a transmitter, which transmits signals, which not only contain the individual identifier, but also information on the rotation speed of the respective wheel, to a receiver, which is fitted with or connected to an antenna provided on the body of the vehicle as well as fitted with or connected to an evaluation device. The antenna is usually mounted on the underside of the vehicle body. The antenna can be connected by means of a cable to the receiver which decodes the received signals and may also amplify them and/or prepare them otherwise. The receiver may also be combined with the antenna in an assembly. The evaluation device is generally arranged at a distance from the antenna in the engine bay or in the interior of the vehicle, for instance behind the dashboard. The receiver can be combined with the evaluation device in an assembly or be separate from it. The receiver can also be split into a part associated with the antenna and a part associated with the evaluation device.

The evaluation device, sometimes also called the central unit of the tire pressure monitoring system, evaluates the signals emitted by the wheel electronics units and shows anomalies of the tire pressure to the driver. The evaluation device is usually connected to a display unit provided in the dashboard of the vehicle. The connections between the evaluation device and the display unit and the receiver are usually provided by cables, for instance by a bus system provided in the vehicle.

For the evaluation device to be able to display, on which wheel an anomaly of the tire pressure occurs, it must know, on which wheel the wheel electronic is situated which signals the anomaly of the tire pressure. For this purpose, the wheel electronics transmit in their signals together with information on the tire pressure also an individual identifier, which usually consists of a digit sequence. For the evaluation device to be able to allocate a received digit sequence to a certain wheel or to a certain wheel position, the identifiers of the wheel electronics mounted in the vehicle and the allocation thereof with respect to the wheel positions must be communicated to said device and stored in memory. Allocation methods are known to that end.

EP 0 806 306 B1 discloses wheel electronics comprising a motion sensor that is an acceleration sensor reacting to radial accelerations and/or tangential accelerations occurring on the wheel. Such an acceleration sensor not only enables to differentiate between a parked vehicle and a stopped vehicle, but also provides information on the rotation speed of the wheel as the gravitational acceleration is superimposed to the radial acceleration and the tangential acceleration of a wheel. The influence of gravitational acceleration changes its sign twice with every rotation of the wheel. The reciprocal of the time span between any two sign changes of the superimposition of the acceleration signal caused by the gravitational acceleration is proportional to the rotation speed of the wheel.

The method disclosed in document EP 0 806 306 B1 compares the rotation speed acquired by the acceleration sensor in the wheel electronics with the rotation speeds provided by ABS sensors for the wheels of the vehicle for the same time span. If matching of the rotation speed measurement originating from the wheel electronic with a rotation speed measurement originating from an ABS sensor can be noticed, the ABS sensor and the corresponding wheel electronic are then assumed to be associated with the same wheel position, for instance front left on the vehicle. A requirement is that the rotation speed measurement originating from the wheel electronic matches a rotation speed measurement originating from only one of the ABS sensors. The identifier is then stored for the position of the ABS sensor, from which the matching rotation speed signal originated. The evaluation device then knows for future signals containing the same identifier, from which wheel or from which wheel position, for example front left, the signal originates.

The known allocation method presupposes that the wheels have differences in terms of rotation speeds when comparing the rotation speeds. These differences can have various origins, for instance slippage between wheel and roadway, different rolling radii caused by different tire sizes or by different loads or by different tire pressures, and in particular cornering. Wheels on the outside of a curve always travel over a longer distance than wheels on the inside of the curve and therefore rotate faster than the wheels on the inside of the curve. The differences in rotation speed between the wheels of a vehicle can be small, even vanishingly small when driving straight. Document EP 0 806 306 B1 therefore requires that a rotation speed value measured by the acceleration sensor in a wheel electronics unit and a rotation speed value measured means by an ABS sensor, are only regarded as matching if they agree within disparities which are unavoidable from a measuring viewpoint. Only if such an excellent matching is noticed for only one of the ABS sensors at a time, the identifier of the wheel electronics unit is allocated to this ABS sensor, which has delivered the matching rotation speed signal. This has the shortcoming that it may be quite a while before the evaluation device has allocated all the received identifiers to an ABS sensor and hence to a wheel position. Moreover, the known method is prone to erroneous allocations. As long as the identifiers of the wheel electronics mounted on the vehicle are not allocated to the wheel positions accurately, no reliable tire pressure control is possible. The method disclosed in EP 0 806 306 B1 has therefore not found its way in practice.

Another automatic allocation method is disclosed in DE 198 56 861 B4. This method enables quick unequivocal allocation of the identifiers to the wheel positions via the evaluation of information on the rotation direction, which is delivered by an acceleration sensor in the wheel electronics, and of received signal levels. However, this method requires the receiving antenna to be arranged at an eccentric location of the vehicle body floor so that the signals, which are sent by the wheel electronics with the same intensity, are received by the receiving antenna with different signal levels. Although this method offers the possibility of a quick and reliable allocation, it cannot be used if a central position is desired for the receiving antenna, so that it can receive signals from all directions equally well. This may be desired, for instance if the receiving antenna is also used for receiving the signals of a radio key, which can hit the receiving antenna from any direction.

An object of the present invention is to create an allocation method which is more reliable and/or faster than the method disclosed in EP 0 806 306 B1.

This object is met by a method having the features specified in claim 1. Advantageous further refinements of the invention are the matter of dependent claims.

The method according to the invention allocates identifiers, which are contained in signals emitted by units of a tire pressure monitoring system of a vehicle, to the positions of ABS-sensors which are each allocated to one of the wheels of the vehicle.

The method uses wheel electronics, which comprise each a pressure sensor, which reacts to the tire pressure of the wheel, a motion sensor, which delivers an information on the rotation speed of the wheel, a memory, in which the individual identifier of the wheel electronic is stored, and a transmitter, which transmits signals containing the individual identifier and the information on the rotation speed of the respective wheel, to a receiver. The receiver is fitted with or connected to an antenna provided on the body of the vehicle. The receiver is also fitted or connected to an evaluation device.

The evaluation device identifies the transmitted identifier and compares the information about the rotation speed of the wheel, which is transmitted together with the identifier, with rotation speed information acquired by the ABS sensors for the same time span and transferred to the evaluation device. The evaluation unit allocates the received identifier to the ABS sensor, whose rotation speed information shows the best matching with the rotation speed information transmitted together with the identified identifier, e.g. a wheel electronics is allocated to the ABS sensor which measured a rotation speed closer to the rotation speed of the wheel electronic than the rotation speed of all other ABS sensors. The allocation is not final. The allocations of identifiers to positions of ABS sensors are repeatedly made and the occurrence of identical allocations is counted until the frequency of the allocation of a certain identifier to a certain ABS sensor significantly outweighs the allocations of the same identifier to all other ABS sensors. The significantly overwhelming allocation is then stored in a memory under the position of the corresponding ABS sensor.

The invention has significant advantages:

The method according to the invention is more reliable than the method disclosed in EP 0 806 306 B1 because it uses not only to a single measurement, but rather several consecutive measurements for allocating the identifier of a wheel electronics to an ABS sensor or to a wheel position.

Nonetheless, the method according to the invention allows a complete allocation of the wheel electronics of a vehicle to the different wheel positions more quickly, because even single measurements which by themselves do not provide unequivocal information about the wheel position to which a certain identifier belongs, contribute to the final result of the allocation process as the results of the individual comparisons are summed up.

As the number of rotation speed measurements and rotation speed comparisons increases, certain allocations, which occur strikingly often, more often than other allocations, become apparent. These allocations, which occur strikingly often and are hence significantly predominant, are the sought-after allocations.

In particular in case of cornering, the evaluation over as short as possible time periods has the advantage that the differences of the distances of all single measurements made while driving through a curve contribute to the final allocation that is then stored in a memory. It is therefore advantageous to select the time periods to be so short that when driving through a curve several consecutive single measurements of the rotation speed of the wheels can be carried out. The method according to the invention then leads quickly to a reliable allocation result. If contrary thereto the time periods for the individual measurements of the wheel rotation speed were selected so long that they may contain the driving through more than one curve, then differences in rotation speed, which for instance occur when driving through a left curve, might be negated by reversed differences in rotation speed when driving through a right curve immediately after. It is therefore preferable to carry out the wheel rotation speed measurements in as short as possible time periods.

If all the identifiers but one identifier are allocated to their ABS sensors or wheel positions, the last unallocated identifier can readily be allocated to the last unallocated ABS sensor. Wheel electronics of spare wheels carried in the vehicle are not taken into account since they do not deliver any rotation speed signal.

The method according to the invention is particularly suitable for tire pressure monitoring systems wherein the receiving antenna is installed on such a central location of the body of the vehicle that it can receive signals of a radio key from all directions with the same good quality and hence also receives the signals originating from the wheel electronics (apart from the influences of the rotation of the wheels) not with truly different intensities.

The method according to the invention is preferably terminated for a given identifier by storing the identifier in memory under the position of an ABS sensor, as soon as the frequency of the allocation of the identifier to a certain position of an ABS sensor exceeds the frequency of the allocation of the same identifier to other ABS sensors by a preset amount. That preset amount may consist of empirical values. The preset amount is preferably a preset limit of the ratio of the frequency of occurrence of the overwhelming allocation of a certain identifier to a certain ABS sensor to the frequency of occurrence of the allocations of the same identifier to the other ABS sensors of the vehicle. But it is also possible to use as a criterion for determining whether a significantly overwhelming allocation of an identifier is to be stored under the position of the corresponding ABS sensor, the exceeding of a limit value of the difference between the frequency of occurrence of the overwhelming allocation of the identifier to the corresponding ABS sensor and the frequency of occurrence of the allocations of the same identifier to the other ABS sensors.

A mathematic frequency matrix is preferably generated in the evaluation device of the tire pressure monitoring system. For instance, the lines of the matrix are allocated to the present ABS sensors and the columns of the matrix are allocated to the identifiers of the wheel electronics which are arranged on the wheels of the vehicle and deliver rotation speed signals. This matrix has an entry for each combination of an ABS sensor with an identifier of a wheel electronic. A counter is assigned to each of these entries. Each counter starts at zero and is increased by "1" every time an allocation of an identifier is made to the ABS sensor that belongs to the counter's field of the matrix. The resulting counts can be interpreted quite easily and enable to decide which allocation significantly outweighs the other allocations. This allocation can then be stored in memory as the allocation of a certain wheel electronics unit to a certain ABS sensor or to a certain wheel position.

The stored allocations are used for evaluating later signals emitted by the wheel electronics to allocate the signals to the present wheel positions and to enable displaying any anomalies by specifying the corresponding wheel position.

The allocation process is preferably performed every time the vehicle is started. It need not end with storing allocations for all wheel electronics in the memory but can rather run on permanently "in the background" which enables to correct any erroneous allocations and thereby to increase the reliability. Another advantage of the possibility to leave the allocation process running permanently, consists in learning automatically any new allocations in the case of a wheel change. There is no need for the drivers to manually initiate an allocation process.

It is particularly preferable to perform the method according to the invention for the wheels on the left-hand side of the vehicle separately from the wheels on the right-hand side of the vehicle. With a usual vehicle fitted with four wheels, only a comparison between the distances travelled by the front wheel and the rear wheel on the same side needs to be initiated. This makes the allocation easier and faster.

The distinction between the wheels on the right side of the vehicle and the wheels on the left side of the vehicle is easily possible in as much as the wheel electronics comprise a motion sensor which not only provides an information on the rotation speed of the wheel, but also an information on the rotation direction. This is possible with acceleration sensors, in particular with piezoelectric acceleration sensors which deliver with one rotation direction a voltage signal with a positive sign and with the opposite rotation direction a voltage signal with a negative sign. For distinguishing the wheels on the right side from those on the left side of the vehicle, it should only be ensured that the wheel electronics units are mounted identically on all the wheels as is usually the case. Then the voltage of a piezoelectric acceleration sensor on wheels on the left side has the opposite sign of the voltage signal of a piezoelectric acceleration sensor on a wheel on the right side of the vehicle. The wheel electronics themselves provide the information which two wheel electronics of a vehicle with four wheels are arranged on the same side of the vehicle and which identifiers these two wheel electronics have. To be able to allocate them unequivocally to the wheel positions of a double axle vehicle, a distinction has to be made between the front wheel and the rear wheel on the right side as well as on the left side of the vehicle. According to the invention this distinction is based on the observation of the different distances travelled by both these wheels when driving through a left curve or a right curve. In both cases, the front wheel travels the longer distance when driving through the curve, regardless of whether it is a left curve or a right curve. This makes it easier to interpret the results of several consecutive measurements and to count, which wheel clearly predominantly travels the longer distances and hence is recognised as the front wheel.

It is an advantage of this further refinement of the invention that it even faster and more easily yields a reliable allocation. The frequency matrix mentioned above is reduced to two single-column "matrices". This shows that only two individual decisions have to be made once the distinction between right and left has been clarified in advance.

The invention claimed is:

1. A method for allocating identifiers of units of a tire pressure monitoring system of a vehicle to positions of ABS-sensors that are each assigned to one of the wheels of the vehicle, which units are hereinafter called wheel electronics and are attached to the wheels of the vehicle, the wheel electronics of each wheel comprising:

a pressure sensor, which is sensitive to the tire pressure of the wheel, a motion sensor for providing information on the rotation speed of the wheel, a memory with an individual identifier of the wheel electronics stored therein, and a transmitter for transmitting signals, which contain the individual identifier and the sensed information on the rotation speed of the respective wheel, the method comprising the following steps for each of the wheels:

(a) obtaining the information on the rotation speed of the respective wheel for a time span;

(b) for the same time span obtaining an information on the rotation speed of every wheel from the ABS sensor of every wheel;

(c) transmitting signals containing the rotation speed information provided by the motion sensor in the wheel electronics of the respective wheel along with the identifier stored in the memory in the wheel electronics of the respective wheel, and also containing the rotation speed information provided by the ABS sensors, to a receiver, which is provided with or connected to an evaluation device and an antenna provided on the vehicle;

(d) receiving in the evaluation device the signals transmitted from the wheel electronics of the specific wheel and from the ABS sensors;

(e) comparing in the evaluation device the rotation speed information transmitted together with the identifier of the specific wheel with the rotation speed information provided by the various ABS sensors for the same time span for which the rotation speed information has been obtained by the motion sensor in the wheel electronics of said specific wheel;

(f) allocating the identifier of the specific wheel to that ABS sensor the rotation speed information of which shows the best matching with the rotation speed information that was transmitted together with the identifier of the specific wheel;

(g) repeating the steps (a) to (f) for the specific wheel until a series of identical allocations has been obtained, that are allocations of the identifier of the specific wheel to the position of the same ABS sensor;

(h) storing in the memory that allocation of the identifier of the specific wheel to the position of said same ABS sensor which has been obtained more often than allocations of the identifier of the specific wheel to the position of another ABS sensors.

2. The method according to claim 1, wherein after storing the penultimate unallocated identifier for the position of an ABS sensor, the last still unallocated identifier is stored readily under the position of the last still unallocated ABS sensor.

3. The method according to claim 1, wherein the time span, which is used for determining the rotation speed information, starts when a component, resulting from the gravitational acceleration, of the acceleration signal acquired in the wheel electronic changes its sign and ends with a later sign change of this component of the acceleration signal acquired in the same wheel electronic.

4. The method according to claim 1, wherein the time span which is used for acquiring the rotation speed signals, is selected in such a way that one or several measurements of rotation speed are possible in each wheel electronic when the vehicle is driven through a typical curve.

5. The method according to claim 1, wherein a mathematic frequency matrix is generated in the evaluation device of the tire pressure monitoring system, said matrix having a counter for each combination of an ABS sensor with an identifier of a wheel electronic, wherein the counter of each combination starts its count at zero at the beginning of the method and is increased by "1" every time an allocation is made to the combination of this counter.

6. The method according to claim 1, which is carried out every time the vehicle is started.

7. The method according to claim 1, which does not end with the storage of the different allocations in the memory of the evaluation device, but rather continues to run, determines the allocations repeatedly, compares the actually determined allocation with the stored allocations, corrects possible errors and thereby increases the reliability of the allocation.

8. The method according to claim 1, which is carried out for the wheels on the left-hand side of the vehicle separately from the wheels on the right-hand side of the vehicle.

9. The method of claim 1, wherein an identifier is stored for the position of an ABS sensor when the frequency of the allocation of the identifier to this position exceeds the frequency of the allocation of the same identifier to other ABS sensors by a preset amount.

10. The method according to claim 9, wherein a preset limit of the ratio of the frequency of occurrence of the overwhelming allocation of an identifier to an ABS sensor to the frequency of occurrence of the allocations of the same identifier to the other ABS sensors of the vehicle is selected as the preset amount.

11. The method according to claim 1, which is terminated for the identifier of the specific wheel after storage of the allocation of the identifier in the memory of the evaluation unit.

12. The method according to claim 11, which is finally terminated with storing the last unallocated identifier for the position of an ABS sensor.

\* \* \* \* \*